United States Patent [19]
Novak

[11] 3,952,155
[45] Apr. 20, 1976

[54] WATER SKI TOW COMMUNICATION SYSTEM

[76] Inventor: Joseph A. Novak, 15451 Saticoy St., Van Nuys, Calif. 91406

[22] Filed: Aug. 9, 1974

[21] Appl. No.: 495,946

[52] U.S. Cl. .................................... 179/1 VE
[51] Int. Cl.² ................................... H04M 1/02
[58] Field of Search .......... 179/1 VE; 114/235 WS; 9/310 A

[56] References Cited
UNITED STATES PATENTS

| | | | |
|---|---|---|---|
| 2,994,861 | 8/1961 | Reinhardt et al. | 179/1 VE |
| 3,018,474 | 1/1962 | Cluck et al. | 340/74 |
| 3,122,609 | 2/1964 | Moore | 179/1 VE |
| 3,665,116 | 5/1972 | Holstrom | 179/1 H |

*Primary Examiner*—Kathleen H. Claffy
*Assistant Examiner*—E. S. Kemeny
*Attorney, Agent, or Firm*—Jessup & Beecher

[57] ABSTRACT

A water ski tow assembly is provided which incorporates a two-way communication system between the skier and the operator of a towing boat. The communication system includes a first microphone/speaker unit mounted in the towing boat and electrically coupled to an electronic amplifier, and a second microphone/speaker unit mounted on the tow line. Appropriate wire leads are threaded through the tow line electrically to interconnect the second microphone/speaker unit with the amplifier. The second microphone/speaker unit is mounted at the junction of the hand lines with the tow line to be held in position in front of the skier while the skier is being towed by the towing boat, so that without further effort the skier can communicate with the operator and vice versa. The second microphone/speaker unit is mounted in a floatation housing, so that in the event of a spill, the second microphone/speaker unit will float in an upright operative position so that the skier and the operator can still communicate with one another.

7 Claims, 3 Drawing Figures

WATER SKI TOW COMMUNICATION SYSTEM

BACKGROUND OF THE INVENTION

The system of the present invention is of the same general type as the assembly described in U.S. Pat. No. 3,122,609. As pointed out in the patent, without an adequate voice communication system, the operator of a boat pulling a water skier is continually required to turn his head to check on the skier. Consequently, the operator cannot concentrate his full attention on either of his responsibilities of maneuvering the towing boat with regard for the safety of the water skier, or of ascertaining the presence and condition of the water skier. Moreover, the water skier, without such a communication system, must from time-to-time give visual hand signals to the operator of the towing boat, which detracts from his concentration. In addition, without a suitable voice communication system, the operator of the towing boat is often unaware that the water skier has fallen, or has let go of the tow, and this can be hazardous, since it is often important that the towing boat return and pick up the skier as soon as possible in case of injury.

The communication system forming the subject matter of the present invention, permits constant voice communication to be carried out between the water skier and the operator of the boat, on a two-way basis, so that each can concentrate on his individual duties. Moreover, the voice communication system of the present invention is constructed so that the microphone/speaker unit at the end of the tow line is held in a floatation housing, so that in the event of a spill the skier can still communicate with the operator, and the operator can still communicate with the skier.

Therefore, the two-way voice communication system of the present invention provides a means whereby the water skier may talk to the boat operator and make his wishes known as to the speed and direction of the boat. In turn, the boat operator can keep the water skier informed of any change in the speed or direction of the boat, thereby eliminating the need for hand signals which are often misunderstood. The system of the invention is also helpful in the instruction of beginners in the waterskiing sport, since it can be used in the preparation and in the start of the ski run, as well as during the actual run itself.

DETAILED DESCRIPTION OF THE ILLUSTRATED EMBODIMENT

Figure 1:
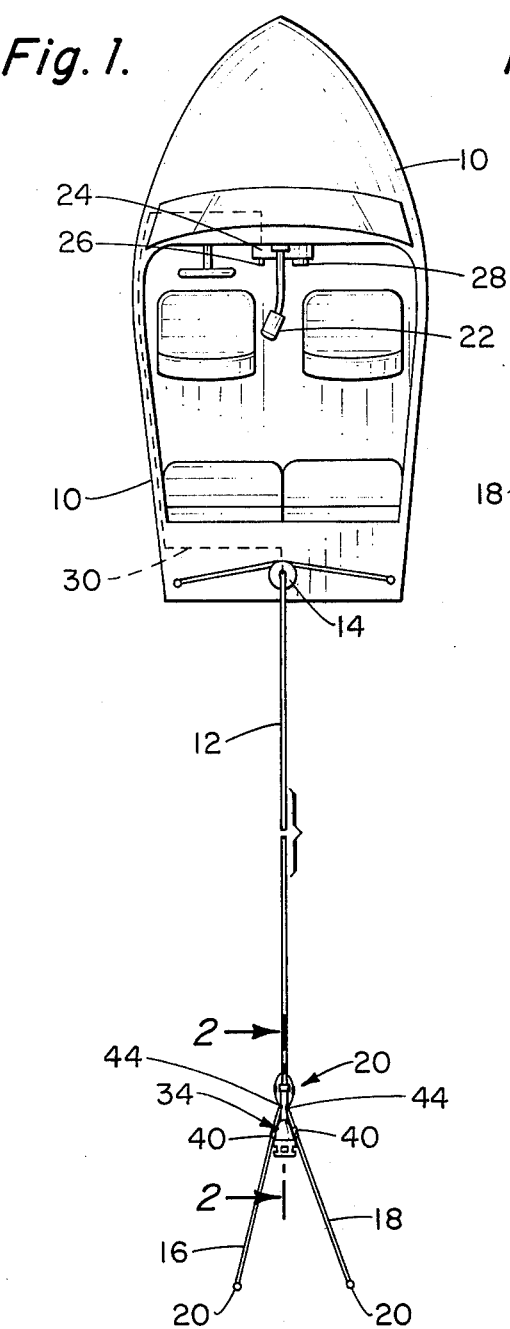
FIG. 1 is a top plan view of a towing boat in which the voice communication system of the invention is installed, and showing a tow line attached to the stern of the boat and extending rearwardly into the position it would normally assume during a waterskiing run.

As shown in the drawing, a towing boat 10 has a tow line 12 attached to its stern by means of a usual fitting 14. The tow line, preferably, is of the hollow core braided type. A pair of hand lines 16 and 18 are joined to the tow line 12 at its remote end at a junction point X, the hand lines 16 and 18 forming a bifurcated end section for the tow line 12. A pair of hand grips 20 are attached to the extremities of the hand lines 16 and 18 to be grasped by the water skier.

A first microphone/speaker unit 22 is mounted on the dashboard of the towing boat 10, and it is electrically connected to an appropriate electronic amplifier 24. The amplifier 24 may, for example, be a known four-stage solid state amplifier. The amplifier 24 includes a usual volume control 26 and a press-to-talk bar 28. A pair of electric leads, designated by the broken line 30 in FIG. 1, interconnect the amplifier 24 to a second microphone/speaker unit 32 (FIG. 2). The leads 30 are threaded through the hollow core of the braided tow line 12.

The microphone/speaker unit 32 is mounted on the lower section 34A of an ovoid-shaped hollow housing 34. As shown in FIG. 2, the unit 32 is mounted coaxially with the central axis of the housing and it forms an enclosure for the lower section by extending across the upper end thereof. The housing 34 also has an upper section 34B in press fit with the lower section, the upper section being apertured to permit voice signals from the skier to enter the housing and activate the microphone/speaker unit 32, and also to permit voice signals from the unit 32 to be heard by the skier.

The housing 34 has an elongated tubular tail section 36 attached to its bottom, and the leads 30, as best shown in FIG. 2, extend through this tail section into the interior of the housing 34 to be connected to the unit 32. The tail section 36 is split at 38 into two semitubular parts 41 and 42, so as to allow it to be placed over the tow line 12 where it forks into the two hand lines 16 and 18. The lines 16 and 18 emerge from the section 36 at the root of the split 38, as shown at 44, and then proceed through respective clips 40 to respective hand grips 20. The clips 40 are secured on opposite sides of the housing 34, and each is made in the form of a short tube having a helical slit 48 and made preferably of a firm but resilient plastic. The slit 48 may be readily opened and closed to attach and detach the lines. The parts 41 and 42 are held together by a circular band 50. Where the leads 30 pass from the line 12 to the tail section 36, they are provided with disconnect plugs 52.

Figure 2:
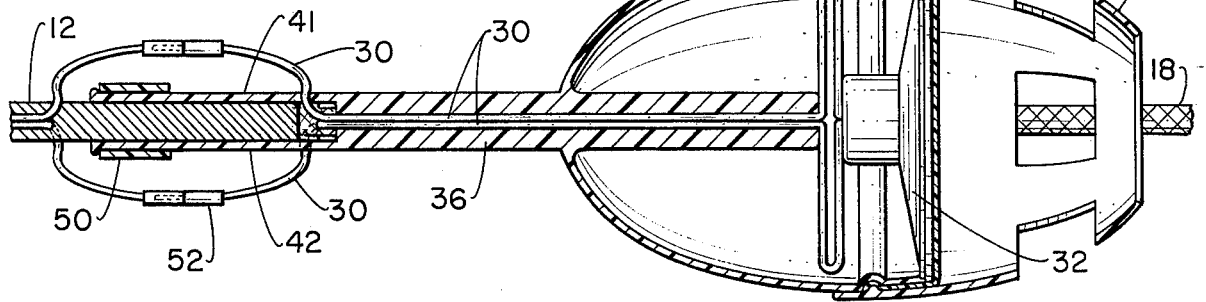
FIG. 2 is an enlarged sectional view of the water skier's end of the tow line of FIG. 1, taken essentially along the line 2—2 of FIG. 1.

As best shown in FIG. 1, the housing 34 is supported at the junction point between the hand lines 16, 18 and the end of the tow line 12. In this way, the microphone/speaker unit 32 is held in position in front of the skier during the ski run, so that without further effort, communication can be had with the operator of the towing boat.

In the operation of the communication system, during a normal ski run, the skier holds the hand grips 20, and thereby positions the housing 34, and the enclosed microphone/speaker unit 32 in position such that communication may be easily carried on with the operator. The amplifier 24 is normally conditioned so that communication from the skier will be immediately heard by the operator of the towing boat. Then, if the operator of the towing boat wishes to communicate with the skier, he depresses the press-to-talk bar 28.

Figure 3:
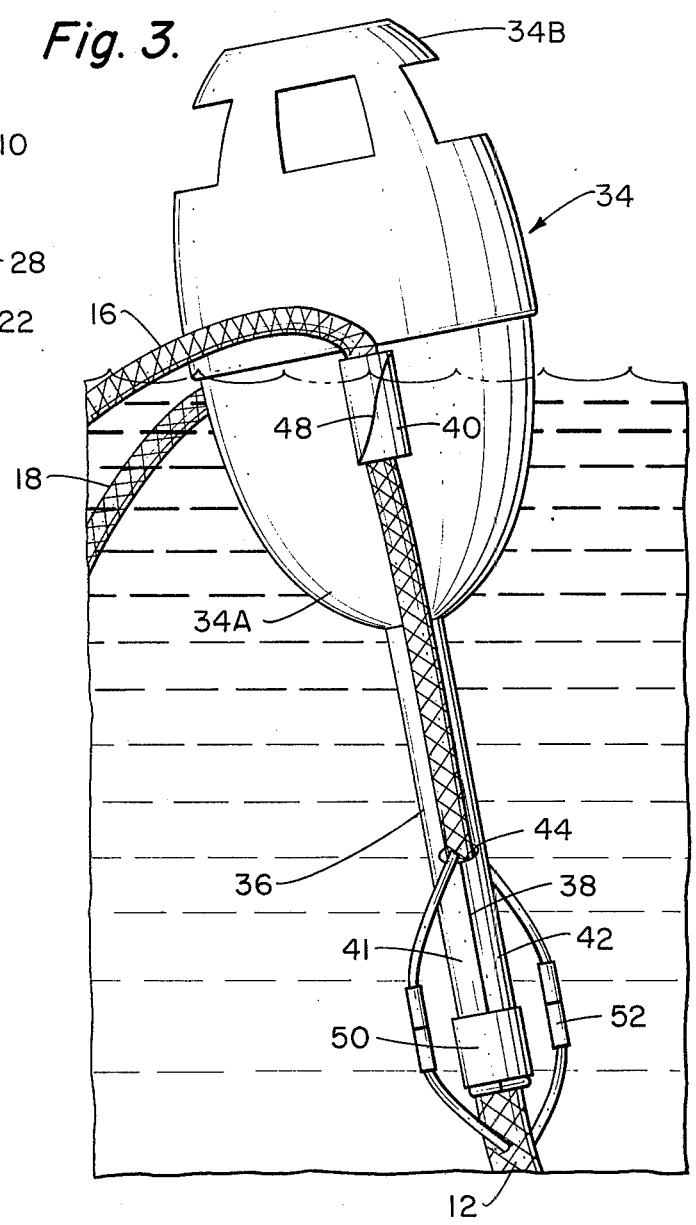
FIG. 3 is an enlarged fragmentary view of a floatation housing containing the skier's microphone/speaker unit, shown in position when floating in the water.

The housing 34 may be made of relatively light plastic material, so as to form a floatation housing for the microphone/speaker unit 32, in the event of a spill. The assembly is such, that when the floatation member is in the water, as shown in FIG. 3, it is held in an upright position by the tail member 36 and the attached tow line, so that the microphone/speaker unit 32 is in an operative position. Therefore, communication can still be maintained between the operator and the water skier under such conditions.

As seen, the unit 32 is readily disconnectible from the tow rope 12, so that it may be removed as desired and used on a different type of tow arrangement, e.g. one having a single bar spanning the hand lines 16/18.

It will be appreciated that although a particular embodiment of the invention has been shown and described, modifications may be made. It is intended in the following claims to cover the modifications which come within the spirit and scope of the invention.

What is claimed is:

1. A water ski tow assembly including:
   a tow line having means at one end thereof for attaching the line to a towing boat and terminating at the other end thereof in at least one hand grip for a water skier to enable the skier to be propelled over the surface of a body of water;
   a first microphone/speaker unit;
   a hollow ovoid housing for said first microphone/speaker unit mounted on said other end of said tow line to provide a floatation means for the first microphone/speaker unit;
   said first microphone/speaker unit being mounted in said housing coaxially with the central axis thereof and forming an enclosure for the lower portion of the housing;
   a second microphone/speaker unit mounted in the towing boat;
   an amplifier unit mounted in the towing boat and electrically coupled to said microphone/speaker units; and
   electric leads extending from said amplifier unit to said first microphone/speaker unit and electrically connected thereto;
   said leads entering the housing through the lower end thereof to hold the housing upright when in the water.

2. The assembly defined in claim 1, in which said tow line has a hollow interior, and in which said electric leads extend along the hollow interior of said tow line.

3. The assembly defined in claim 1, in which said tow line has a bifurcated section at said other end thereof to form two separate hand lines each terminating in a hand grip for the skier, and in which said housing is mounted at the junction of the lines of said bifurcated section.

4. The assembly defined in claim 1, in which said housing has an elongated tubular tail portion at the lower end thereof through which the tow line extends to hold the housing in an upright position when the housing is floating in the water.

5. The assembly defined in claim 4, in which the hand lines of the bifurcated end section of the towing line extend out through openings in the side of said tail portion, and which includes a pair of clip members mounted diametrically opposite one another on the side of said housing and coupled to the hand lines of the bifurcated section of the tow line.

6. The assembly defined in claim 1, in which said housing includes a lower section in which said first microphone/speaker unit is mounted, and an apertured upper section in press fit with the lower section.

7. The assembly defined in claim 1, having disconnect plug means in said leads between said housing and said tow line.

* * * * *